United States Patent
Van De Waerdt et al.

(10) Patent No.: US 6,643,739 B2
(45) Date of Patent: Nov. 4, 2003

(54) CACHE WAY PREDICTION BASED ON INSTRUCTION BASE REGISTER

(75) Inventors: Jan-Willem Van De Waerdt, Sunnyvale, CA (US); Paul Stravers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 39 days.

(21) Appl. No.: 09/805,384

(22) Filed: Mar. 13, 2001

(65) Prior Publication Data

US 2002/0133672 A1 Sep. 19, 2002

(51) Int. Cl.$^7$ .............................................. G06F 12/00
(52) U.S. Cl. ...................... 711/128; 711/128; 711/137; 711/204; 711/213
(58) Field of Search ............................ 711/3, 118, 128, 711/137, 204, 213

(56) References Cited

U.S. PATENT DOCUMENTS

| | | | | |
|---|---|---|---|---|
| 5,860,151 A | * | 1/1999 | Austin et al. ................ | 711/213 |
| 5,903,768 A | * | 5/1999 | Sato ............................. | 712/1 |
| 6,247,094 B1 | * | 6/2001 | Kumar et al. .................. | 711/3 |
| 6,356,990 B1 | * | 3/2002 | Aoki et al. .................. | 711/205 |
| 6,393,549 B1 | * | 5/2002 | Tran et al. .................. | 712/204 |

OTHER PUBLICATIONS

Calder B et al: "Predictive Sequential Associative Cache" Proceedings. International Symposium on High–Performance Computer Architecture, XX, XX, Feb. 1996, pp. 244–253, XP000952262 p. 247, left–hand column, paragraph 4—p. 249, left–hand column, paragraph 4.

"A High Performance and Low–Power Cache Architecture with Speculative Way–Selection", by Koji Inoue et al, published in IEICE Trans. Electron., vol. E83–C, No. 2, Feb. 2000, pp. 186–194.

* cited by examiner

*Primary Examiner*—Donald Sparks
*Assistant Examiner*—Ngoc V Dinh
(74) *Attorney, Agent, or Firm*—Michael Schuitt

(57) ABSTRACT

A way prediction scheme for a partitioned cache is based on the contents of instructions that use indirect addressing to access data items in memory. The contents of indirect-address instructions are directly available for use, without a memory address computation, and a prediction scheme based on this directly available information is particularly well suited for a pipeline architecture. Indirect addressing instructions also provide a higher-level abstraction of memory accesses, and are likely to be more indicative of relationships among data items, as compared to the absolute address of the data items. In a preferred embodiment, the base register that is contained in the indirect address instruction provides an index to a way-prediction table for an n-way associative cache. Data items that are indirectly addressed using the same base register are likely to be related, and thus predicting a particular way in an n-way associative memory based on the base register of an indirect address instruction is likely to result in a cache-hit, thereby reducing the energy consumption associated with accessing all ways in the cache.

13 Claims, 2 Drawing Sheets

FIG. 1 [Prior art]

CACHE WAY PREDICTION BASED ON INSTRUCTION BASE REGISTER

BACKGROUND OF THE INVENTION

1. Field of the Invention

This invention relates to the field of computer systems, and in particular to a predictive n-way associative cache that uses the instruction base register as a predictor of the particular way in the cache that is likely to contain an addressed data item.

2. Description of Related Art

Cache systems are commonly used to reduce the effective delay associated with access to relatively slow memory devices. When a processor requests access to a particular data item in the slower memory, the cache system loads the requested data item into a higher speed memory. Thereafter, subsequent accesses to this same data item are provided via the higher speed memory, thereby avoiding the delay associated with the slower memory. Generally, a "line" of data items that contains the requested data item is loaded from the slower memory into the higher speed memory when the data item is requested, so that any data item within the loaded line can be subsequently provided by the higher speed memory.

The effectiveness of a cache memory access system is provided by the likelihood that future data accesses are related to prior data accesses. Generally, the likelihood of a requested data item being contained in the same line of cache as a prior requested data item is substantially higher than zero, and therefore the likelihood of satisfying the request from the higher speed cache memory is correspondingly substantially higher than zero.

Higher speed memory is more costly than slower speed memory, and therefore the amount of available cache memory is generally limited. Cache management schemes are used to determine which data items to remove from the higher speed memory when a new line of data needs to be loaded into the higher speed memory. A commonly used prioritization scheme for retaining data items in the higher speed memory is a "least recently used" (LRU) criteria, wherein the line of the least recently used (i.e. "older") memory access is replaced by the new line, thereby retaining recently used/accessed data items. Other criteria, such as "most often used", may also be used, typically in conjunction with the LRU prioritization scheme.

Associative caches are commonly used to store lines of data items based upon a subset of the address of the requested item. FIG. 1 illustrates a conventional addressing scheme for an associative cache 100. An address 110, typically from a processor and discussed further below, is logically partitioned into a tag field 111, an index field 112, and a word field 113. The index field 112 provides an index to an associated set of cache lines in a cache 120. Each cache line of the set is termed a "way", and the cache 100 corresponds to an n-way associative cache. The size of the word field 113, j, corresponds to the size of a data line, $2^j$. That is, if there are sixteen words per data line, then the size of the word field 113 will be four-bits; if there are sixty four words per data line, then the word field 113 will be six-bits wide. Using this power-of-two relationship between the word field 113 and the size of the data line, the tag and index fields uniquely identify each data line in the memory.

When an addressed data item is loaded into the cache 120 from a slower memory (not shown), the line of data containing the data item is placed in a select way, the index field defining the location in the selected way for placing the data line. The selection of the way is effected using one of a variety of commonly available algorithms, such as the aforementioned LRU prioritization scheme. When the addressed data item is stored in a particular line area DLine-a, DLine-b, etc. in the cache 120, the tag field 111 is also stored, as illustrated by fields Tag-a, Tag-b, etc. in FIG. 1. The stored tag field, in combination with the data line's location within the way, corresponding to the data line's index field, uniquely identifies the data line that is stored in the cache 120.

Before an addressed data item is loaded into the cache 120, the cache 120 is checked to determine whether the data item is already located in the cache 120, to potentially avoid having to load the data item from the slower memory. The addressed data item may be located in the cache due to a prior access to this data item, or, due to a prior access to a data item within the same line of data DLine-a, DLine-b, etc. as the currently addressed data item. The index field 112 defines the set of n-lines in the cache that are associated with this address. Each of the stored tags 121a, 121b, etc. corresponding to each of the stored lines 125a, 125b, etc. in the associated set is compared to the tag field 111 of the addressed data item, via the comparators 130a, 130b, etc. While this comparison is being made, each of the stored data lines 125a, 125b, etc. corresponding to the index field 113 are loaded into a high-speed buffer 140, so as to be available if the data item is currently loaded in the cache.

If the addressed data item is currently loaded in the cache, the corresponding comparator 130a, 130b, etc. asserts a cache-hit signal, thereby identifying the particular way Hit-a, Hit-b, etc. that contains the data line. If a hit is asserted, the appropriate word is retrieved from the corresponding buffer 140, using the word field 113 to select the appropriate word 141a, 141b, etc. from the data line contained in the buffer 140. The retrieved word is forwarded to the processor that provided the address 110. In a conventional embodiment of the cache system 100, the time required to effect the comparison of the tag field 111 to the stored tag fields 121a, 121b, etc., and the subsequent selection of the appropriate word 141a, 141b, etc. when a cache-hit occurs, is substantially less than the delay time corresponding to the slower memory. In this manner, the effective access time to a data item is substantially reduced when the data item is located in the cache 120.

If a cache-hit does not occur, the above described load of the addressed data line from memory into a select way, Way-a, Way-b, etc., of the cache 120 is effected, typically by loading the data line into the least recently used (LRU) way, or other prioritization scheme, as mentioned above.

The time required to store words, effectively from the processor to the memory, is similarly accelerated via use of the cache 120. The presence of the addressed data item in the cache 120 is determined, using the above described comparison process. If the data item is currently located in the cache 120, the new value of the data item from the processor replaces the select word, or words, of the buffer 140, and the buffer 140 is loaded into the data line 125a, 125b, etc. containing the addressed data item. The "modified" field 129 is used to signal that the contents of a cached line have changed. Before a data line is overwritten by a new data line, the modified field 129 is checked, and, if the data line has been modified, the modified data line is stored back into the memory, using the stored tag field 121a, 121b, etc. to identify the location in memory to store the line.

Although an n-way associative cache provides an effective means for increasing the effective memory access speed, the simultaneous way-comparison scheme, wherein the tag of the addressed data item is compared to all of the stored tags, consumes energy at a rate that is n-times higher than a one-way associative cache. It is not uncommon for n-way associative caches to be substantially hotter than other areas of an integrated circuit, or printed circuit boards.

To reduce the power consumption of a conventional n-way associative cache, predictive techniques are applied to select a likely way corresponding to a given address. In a conventional embodiment of a way prediction scheme, the likely way is first checked for the addressed data item, and only if that way does not contain the addressed data item, are the remaining ways checked. "A HIGH-PERFORMANCE AND LOW-POWER CACHE ARCHITECTURE WITH SPECULATIVE WAY-SELECTION", by Koji Inoue et al, published in IEICE Trans. Electron., Vol. E83-C, No. 2, February 2000, pages 186–194, and incorporated by reference herein, presents a way-prediction scheme, and a comparison of the energy consumption by a way-prediction scheme to non-predictive schemes. If the prediction success rate is high, the energy savings can be quite substantial, because a reduction in energy by a factor of n is achieved each time the way-prediction is correct.

Illustrated in FIG. 1 is an example way prediction table 150 that is used to predict the particular way that is associated with an addressed data item. A subset of the data address 110 is used to index the way-prediction table 150. A variety of schemes may be used to define this subset of the address 110, and to define the algorithm used to provide the contents of the way-prediction table 150. A straightforward embodiment uses the index field 113 as the subset that is used to index the table 150, and the contents of the table 150 correspond to the least recently used (LRU) way, Way-a, Way-b, etc., for each index. Alternatively, a subset of the index field 112, or a subset taken from both the tag 111 and the index 112 fields may also be used to provide an index to the way-prediction table 150. The choice of the subset of the address 110 used to index the way-prediction table, and the number, n, of ways, determines the size of the required way-prediction table. In an 8-way associative cache, three bits are required to uniquely identify each of the ways in the way-prediction table, and the number of three-bit entries in the table 150 is determined by the number of unique combinations of the subset of the address used to index the table 150. If ten bits are used to index the table 150, for example, 1024 ($2^{10}$) three-bit entries must be supported in the table 150.

When an address 110 is requested, the predicted way from the way-prediction table 150 is used to selectively access only the predicted way. For convenience, the subscript p is used hereinafter to designate the predicted way. The stored tag 121p corresponding to the index field 112 in the selected way p is provided to the comparator 130p of the selected way, and the corresponding data line 125p is provided to the buffer 140p of the selected way p. The Hit-p signal is asserted if the predicted way contains the data line, and the addressed word is provided to the requesting processor from the buffer 140p. If the predicted way p does not contain the addressed data item, each of the other, non-predicted, ways are checked for the presence of the addressed data item, using the techniques discussed above for checking an n-way associative cache for an addressed data item.

If none of the ways contains the addressed data item, the data line that contains the addressed data item is loaded from the memory into the cache 120, typically into the least recently used way at the index position. Assuming that the way-prediction table 150 is configured to store the most recently used way, an identification of the way that was used to store the data line is stored into the way prediction table 150. In this manner, a subsequent request for a data item in the same data line as the currently addressed data item will produce the correct predicted way, and thereby save power consumption.

Variations on this power-saving scheme may also be used. For example, all of the tags 121a, 121b, etc. may be loaded into the corresponding comparator 130a, 130b, etc., but only the data line 125p of the predicted way p may be loaded into the buffer 140p. In this manner, some power savings are achieved by avoiding the loading of all of the data lines 125a, 125b, etc. of the non-predicted ways into the buffers 140a, 140b, etc., while also avoiding the time required to recheck all of the tag fields 121a, 121b, etc. when the predicted way does not contain the addressed data item. If one of the other tag comparators 130 asserts a hit signal, the data line of the corresponding way is loaded into the corresponding buffer 140, and the appropriate word is provided to the processor. If none of the other tag comparators 130 assert a hit signal, the addressed data line is loaded from memory into the cache 120, as discussed above.

Note that in a conventional way-prediction scheme as illustrated in FIG. 1, the way-prediction occurs after the determination of the memory address that corresponds to the indirect address in the instruction. In a pipeline architecture, the determination of the memory address is often on the critical path, and any additional delay that is introduced for way-prediction may have a direct impact on overall processor performance.

BRIEF SUMMARY OF THE INVENTION

It is an object of this invention to provide a method and system that allows way-prediction outside the critical path of a processor. It is a further object of this invention to provide a method and system that potentially improves the success rate of way-prediction in an n-way associative cache. It is a further object of this invention to provide a way-prediction scheme that is more efficient than conventional address-based way-prediction schemes.

These objects, and others, are achieved by providing a way prediction scheme for an n-way associative cache that is based on the contents of instructions that use indirect addressing to access data items in memory. The contents of the indirect address instruction are available at any time for pipeline processing, and the way-predicting scheme of this invention does not require a memory address computation. The contents of an indirect addressing instruction also provide a higher-level abstraction of memory accesses, and are therefore likely to be more indicative of relationships among data items than the absolute address of the data items. In a preferred embodiment, the base register that is contained in the indirect address instruction provides an index to a way-prediction table. Data items that are indirectly addressed using the same base register are likely to be related, and thus predicting a particular way in an n-way associative memory based on the base register of an indirect address instruction is likely to result in a cache-hit, thereby reducing the energy consumption associated with accessing all ways in the cache.

BRIEF DESCRIPTION OF THE DRAWINGS

The invention is explained in further detail, and by way of example, with reference to the accompanying drawings wherein.

Figure 1:
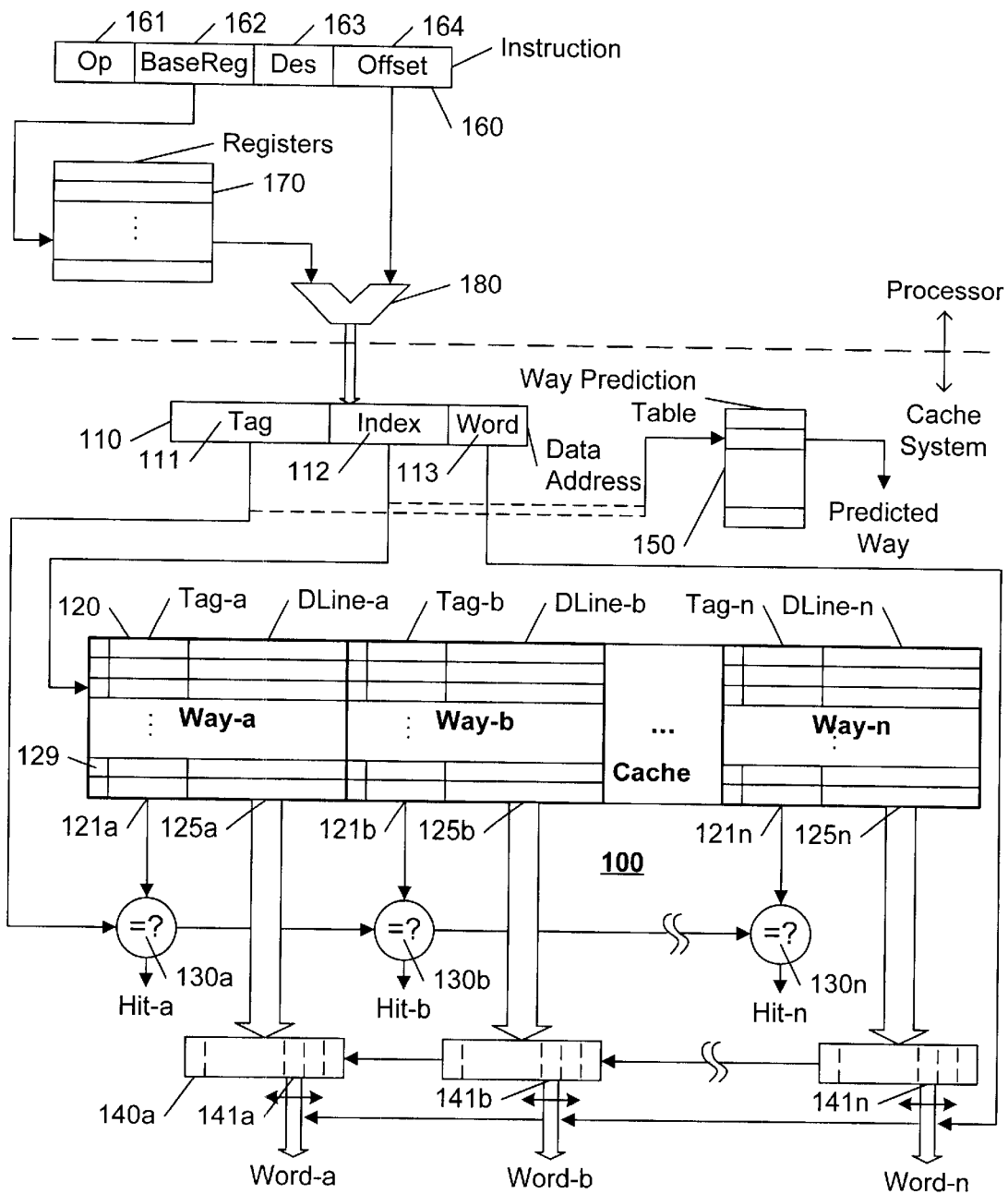
FIG. 1 illustrates an example block diagram of a prior art n-way associative cache with way-prediction.

Throughout the drawings, the same reference numerals indicate similar or corresponding features or functions. Items with suffix letters indicate particular examples of a common feature or function. References in the specification to such items without a particular suffix letter indicate any or all of the illustrated items having the same numeric reference.

DETAILED DESCRIPTION OF THE INVENTION

Illustrated in FIG. 1 is a common method for indirectly addressing data items in memory via an indirect addressing instruction 160. The instruction 160 that is provided to the processor contains an operation code field 161, such as "load", "store", etc. which defines the operation to be performed. The base register 162 and offset 164 fields are used to indirectly reference an address in memory, as detailed further below. The register field 163 identifies the internal register of the processor that receives (in a "load" instruction) or provides (in a "store" instruction) the data item.

With a large addressing space, the size of an instruction necessary to contain an explicit, or direct, address would be large. To address even a relatively small address space of 64K words, for example, sixteen bits would need to be allocated in an instruction to contain the address. Larger address spaces would require correspondingly larger instruction widths to contain the address. As an alternative to providing an explicit address in each data transfer instruction, the address is stored in a register 170, and the instruction 160 merely contains an identifier 162 of this register. A reference to a register 170 in an instruction 160 provides an indirect reference to the address contained in the register 170. Typically, 8, 16, 32, or 64 registers are provided, requiring only 3, 4, 5, or 6 bits, respectively, for storing the identification 162 of the address in the instruction 160. Each of the registers 170 is sized sufficiently to contain the addresses corresponding to the address space of the memory. To avoid having to reload a register 170 with each new address, an offset field 164 is provided in the indirect address instruction 160. The absolute address 110 corresponding to a reference 162 to a base register 170, and an offset 164, in an instruction 160 is determined by the sum of the contents of the base register 170 and the offset 164, via the adder 180. Depending upon the particular processor, the offset may be a signed or an unsigned integer, the signed integer configuration allowing for both forward and reverse offsets from the contents of the base register 170.

This invention is premised upon the observation that indirect addressing instructions often provide a higher-level abstraction of data relationships in a program. For example, a compiler will typically place all temporary variables that are within a subroutine into contiguous memory locations. Assuming that these temporary variables are each within the offset range of a base address, the compiler will correspondingly identify a particular base register for referencing each of these temporary variables. Each time a temporary variable is referenced, the same base register will appear in the instruction 160. In like manner, the particular arguments passed to a subroutine, or pointers to these arguments, will often be temporarily stored in contiguous or near-contiguous memory locations, and will correspondingly be referenced to a common base register. Other examples of the use of a common base register to reference spatially related data items in memory include references to items in an array, characters in a text string, and so on. Viewed another way, indirect addressing instructions that contain the same base register are likely to reference items that are spatially related to each other, and therefore predicting data relationships based on the occurrence of indirect addressing instructions that contain the same base register is likely to be successful, i.e. provide a high cache-hit rate.

Although this invention is particularly well suited for use in an n-way associative cache, it may be applied to other cache schemes that conventionally use a field of an address to predict a section of a cache that is likely to contain a referenced data item. By augmenting or replacing the conventional address field that is used for the prediction with an identification of a referenced base register, a higher cache-hit rate can be expected, because of the implicit correlation between the use of a base register and the existence of a spatial relationship among data items. For ease of reference, the invention is presented herein using the paradigm of an n-way associative cache, although its application to other cache schemes that use partitioned cache will be evident to one of ordinary skill in the art.

Figure 2:
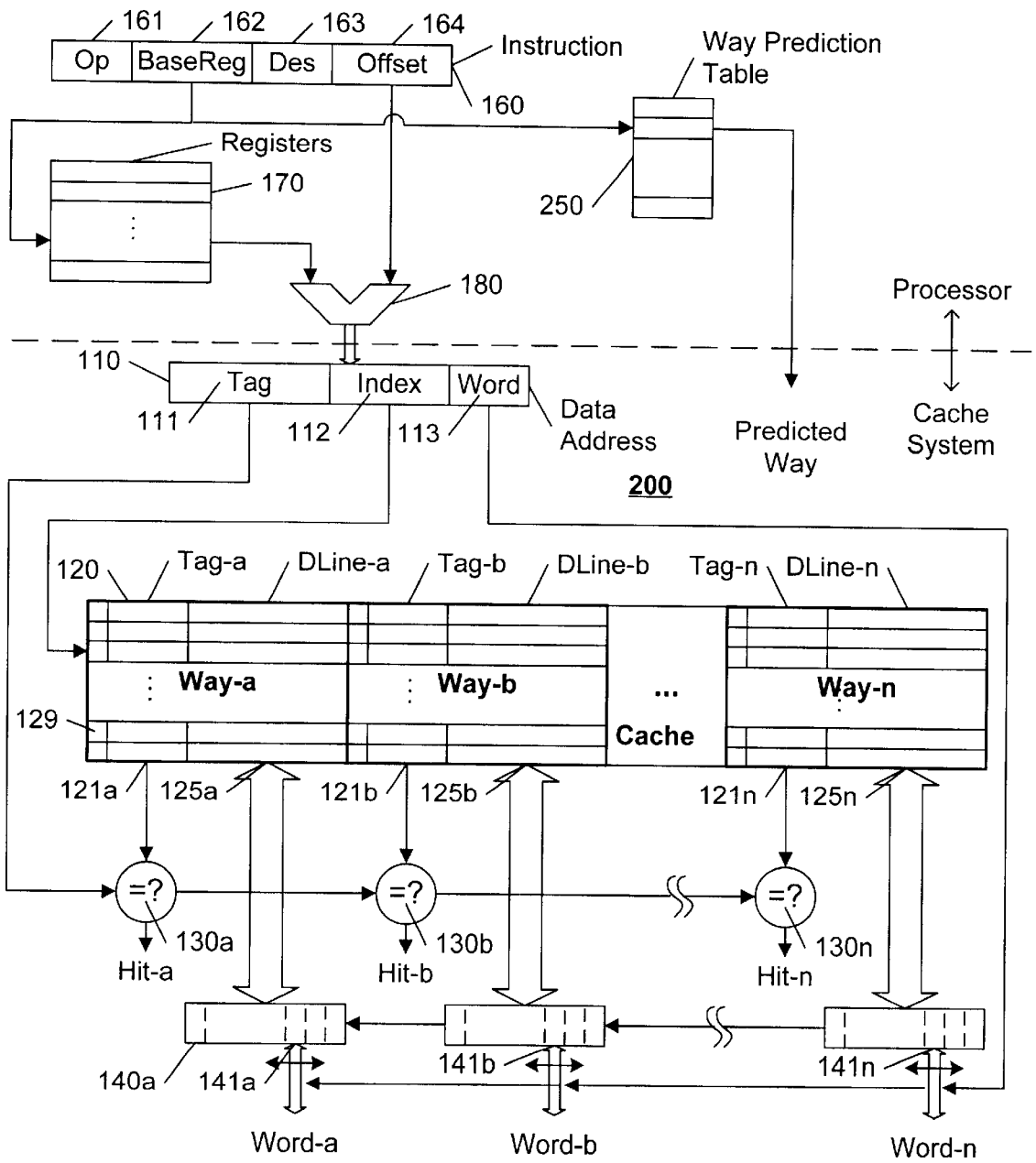
FIG. 2 illustrates an example block diagram of an n-way associative cache with way-prediction in accordance with this invention.

FIG. 2 illustrates an example block diagram of an n-way associative cache 200 with way-prediction in accordance with this invention. As illustrated in FIG. 2, a way-prediction table is provided that uses the contents of an indirect addressing instruction 160 that is provided to the processor as a basis for predicting a way of the cache 120 corresponding to a referenced data item. In the example shown, the base register 162 provides an index to the way-prediction table 250 for producing the predicted way. Because instructions that contain the same base register 162 are likely to refer to related data items within the range of the offset 164 of the contents of the base register 170, the predicted way is likely to be the way that contains the referenced data item, if the data item is, in fact, in the cache 120.

The likelihood of the predicted way containing the referenced data item is dependent upon the number of data items contained in each cache line; the more items in the line, the higher the likelihood of the referenced data item being within the line. In like manner, the likelihood of the predicted way containing the referenced data item can be increased by using cache allocation schemes that are likely to store related cache lines into the same way. That is, for example, the aforementioned LRU prioritization scheme for determining which way to use to load a new cache line can be modified to favor loading the new cache line into the same way as a prior loaded cache line having the same base register 162. These and other schemes for improving the effectiveness of an indirect-address-based prediction scheme as taught in this disclosure will be evident to one of ordinary skill in the art.

In addition to providing a prediction scheme that does not require a memory address computation, and that potentially improves the success rate of the prediction, the way-prediction table 250 of this invention can be expected to consume significantly less resources than the convention way-prediction table 150. As noted above, the number of registers 170 is generally limited to 64, and commonly 32. The total memory requirement for a way-prediction table 250 in accordance with this invention is equal to the number of registers 170 multiplied by the number of bits required to uniquely identify each way of the cache 120. Generally, the number of registers 170 is substantially fewer than the number of indexes provided for in the index field 112 of the address 110, and therefore a reduction in the size of the way-prediction table is achieved.

In a preferred embodiment, the instruction 160 is processed to initiate a data access before the instruction is actually executed, although the data access may be initiated when the instruction is executed. The content of the base register 162 is used to index a predicted way in the way-prediction table 250. This predicted way is used to enable the predicted way p in the cache 120 so as to check, via the comparator 130p, whether or not the addressed data item is contained in the predicted way. Simultaneous with this checking, the data line 125p is loaded into the buffer 140p, so as to be immediately available, should the predicted way p contain the addressed data item. If the predicted way contains the addressed data item, the word field 113 selects the addressed data item from the data line in the buffer 140p, and provides it to the processor when the instruction 160 is executed. If the predicted way p does not contain the addressed data item, the other ways are checked, as detailed above with regard to FIG. 1.

The foregoing merely illustrates the principles of the invention. It will thus be appreciated that those skilled in the art will be able to devise various arrangements which, although not explicitly described or shown herein, embody the principles of the invention and are thus within its spirit and scope. For example, a combination of the base register 162 and a subset of the offset 164 can be used to provide an additional level of precision in the prediction. That is, for example, if the offset is a signed integer, a combination of the base register 162 and the most-significant-bit of the offset 164 provides for a way prediction for references to items below the base address contained in the register 170, and a way prediction for references to items above the base address. Using additional bits of the offset 164 further refines the prediction; in the extreme, the way-prediction table may be configured to provide a prediction for each data line sized segment of the offset 164. Although this configuration may require as many bits of storage as the conventional address-based tag prediction, or more, the use of the base register to organize the way-prediction table can be expected to provide a substantially higher cache-hit rate than a conventional address-based way-prediction scheme. These and other system configuration and optimization features will be evident to one of ordinary skill in the art in view of this disclosure, and are included within the scope of the following claims.

We claim:

1. A cache system comprising:
a cache memory comprising a plurality of sections,
   each section of the plurality of sections comprising a plurality of stored lines
wherein
   the cache system is configured
      to determine, without access to a base address register, whether an addressed data item is located in a corresponding data line of the plurality of stored data lines in a predicted section of the plurality of sections and
   the predicted section is based upon a portion of an indirect addressing instruction which specifies an address of a base address register.

2. The cache system of claim 1, wherein
the cache memory corresponds to an n-way associative cache, each way of the n-way associative cache forming a section of the plurality of sections, the predicted section being a predicted way,
   each way further comprising
      a plurality of stored tags corresponding to the plurality of stored data lines,
      each of the plurality of stored data lines and the plurality of stored tags being uniquely addressable via an index field of the address of the addressed data item,
wherein
   the n-way associative cache is configured
      to determine whether the addressed data item is located in the predicted way by comparing a tag field of the address to a stored tag of the plurality of stored tags corresponding to the index field of the address in the predicted way.

3. The cache system of claim 2, wherein
the n-way associative cache is further configured
   to compare the tag field of the address to stored tags in other ways of the plurality of sections, if the addressed data item is not located in the corresponding data line in the predicted way,
   so as to determine whether the addressed data item is located in a corresponding data line in the other ways.

4. The cache system of claim 3, wherein
the n-way associative cache is further configured
   to load the addressed data item from a memory and into a select way of the plurality of sections, if the addressed data item is not located in the corresponding data line in the predicted or other ways.

5. The cache system of claim 1, wherein
the predicted section is further based upon a portion of the indirect addressing instruction which specifies an offset value from an address value contained in the base address register.

6. The cache system of claim 1, wherein
the predicted section is based upon a least-recently-used determination.

7. A processor, comprising:
an instruction register that is configured to receive program instructions that include at least one indirect addressing instruction that provides an indirect reference to a referenced data item in a memory, and
a prediction device, coupled to the instruction register, that is configured to identify a predicted section of a plurality of sections in a cache that is likely to contain the referenced data item, based on a subset of bits contained in the instruction register, without access to the contents of a base address register.

8. The processor of claim 7, wherein
the subset of bits contained in the instruction register includes an identification of a base register that contains a base address that is used to determine an address of the referenced data item in the memory.

9. The processor of claim 8, wherein
the subset of bits contained in the instruction register further includes at least a part of an offset field that is also used to determine an address of the referenced data item in the memory.

10. The processor of claim 7, wherein
the plurality of sections in the cache correspond to a plurality of ways in an n-way associative cache, and
the predicted section corresponds to a predicted way of the plurality of ways.

11. A method for predicting a section of a cache that is likely to contain a referenced data item, comprising:
extracting a plurality of bits from an indirect addressing instruction that indirectly addresses the referenced data item, and
determining the section of the cache based on the plurality of bits from the indirect addressing instruction, without access to the contents of a base address register.

12. The method of claim 11, wherein
the plurality of bits includes an identifier of a base register that is used to determine an address of the referenced data item.

13. The method of claim 12, wherein
the plurality of bits further includes at least a portion of an offset field that is further used to determine the address of the referenced data item.

* * * * *